United States Patent
Legrand

(10) Patent No.: US 10,100,182 B2
(45) Date of Patent: Oct. 16, 2018

(54) CUTTING FILAMENT WITH IMPROVED COMPOSITION FOR EDGE TRIMMERS, SCRUB CUTTERS AND THE LIKE

(75) Inventor: Emmanuel Legrand, St. Germain sur Renon (FR)

(73) Assignee: SPEED FRANCE SAS, Arnas (FR)

( * ) Notice: Subject to any disclaimer, the term of this patent is extended or adjusted under 35 U.S.C. 154(b) by 261 days.

(21) Appl. No.: 13/034,829

(22) Filed: Feb. 25, 2011

(65) Prior Publication Data

US 2011/0152404 A1    Jun. 23, 2011

Related U.S. Application Data

(63) Continuation-in-part of application No. 12/936,512, filed as application No. PCT/EP2008/054421 on Apr. 11, 2008, now abandoned.

(51) Int. Cl.

| | |
|---|---|
| C08K 11/00 | (2006.01) |
| C08L 23/10 | (2006.01) |
| C08L 23/06 | (2006.01) |
| C08L 77/00 | (2006.01) |
| C08K 5/00 | (2006.01) |
| C08K 5/098 | (2006.01) |
| C08L 23/08 | (2006.01) |
| C08L 51/06 | (2006.01) |

(52) U.S. Cl.
CPC .............. *C08L 23/10* (2013.01); *C08L 23/06* (2013.01); *C08L 77/00* (2013.01); *C08K 5/0033* (2013.01); *C08K 5/098* (2013.01); *C08L 23/0876* (2013.01); *C08L 51/06* (2013.01)

(58) Field of Classification Search
CPC .......... C08L 23/10; C08L 77/00; C08L 23/06; C08L 51/06; C08K 5/098
USPC ................ 428/364, 370, 373–379, 395–399; 525/57, 240, 221, 420, 66; 30/276, 347, 30/247
See application file for complete search history.

(56) References Cited

U.S. PATENT DOCUMENTS

| | | | | |
|---|---|---|---|---|
| 3,840,512 | A | * 10/1974 | Brackman | ................ C08K 5/09 |
| | | | | 260/DIG. 43 |
| 3,963,799 | A | 6/1976 | Starkweather, Jr. | |
| 4,406,065 | A | 9/1983 | Kohler | |
| 5,108,807 | A | * 4/1992 | Tucker | .......................... 428/35.2 |
| 5,278,229 | A | * 1/1994 | Asano et al. | .................... 525/57 |
| 5,342,886 | A | 8/1994 | Glotin et al. | |

(Continued)

FOREIGN PATENT DOCUMENTS

| | | |
|---|---|---|
| CN | 101665625 A | 3/2010 |
| EP | 0 342 066 A1 | 11/1989 |

(Continued)

*Primary Examiner* — Hai Vo
(74) *Attorney, Agent, or Firm* — Womble Bond Dickinson (US) LLP

(57) ABSTRACT

The present invention relates to a cutting member, especially to a cutting filament, for a plant-cutting device such as a scrub cutter or edge trimmer wherein at least one portion of the cutting member is a mixture of at least a polyamide, at least one thermoplastic polyolefin and at least one prodegradant agent.
Another object of the invention relates to a composition for use in the manufacture of a cutting member by extrusion/drawing or by injection, made from a mixture of at least a polyamide, at least one thermoplastic polyolefin and at least one prodegradant agent.

6 Claims, 2 Drawing Sheets

(56) References Cited

U.S. PATENT DOCUMENTS

| | | | |
|---|---|---|---|
| 5,709,942 A * | 1/1998 | Leydon et al. | 428/375 |
| 5,759,925 A | 6/1998 | Ballard et al. | |
| 5,814,384 A * | 9/1998 | Akkapeddi et al. | 428/35.7 |
| 5,883,186 A * | 3/1999 | Gottschalk | C08L 23/10 525/178 |
| 6,061,914 A * | 5/2000 | Legrand | 30/347 |
| 6,327,782 B1 * | 12/2001 | Blevins | 30/276 |
| 6,560,878 B2 * | 5/2003 | Skinner et al. | 30/347 |
| 2002/0086156 A1 | 7/2002 | Walsh | |
| 2003/0033960 A1 * | 2/2003 | Hudzinski | 106/206.1 |
| 2004/0043689 A1 | 3/2004 | Ortega et al. | |
| 2005/0154097 A1 * | 7/2005 | Bonora | C08K 5/34 524/90 |
| 2007/0123092 A1 | 5/2007 | Legrand | |
| 2011/0027510 A1 * | 2/2011 | Lee | C08L 23/02 428/35.7 |

FOREIGN PATENT DOCUMENTS

| | | | |
|---|---|---|---|
| EP | 0 997 268 A1 | 5/2000 | |
| EP | 1 057 870 A1 | 12/2000 | |
| EP | 0 802 207 B1 | 10/2001 | |
| EP | 0 742 236 B1 | 1/2002 | |
| EP | 0 816 067 B1 | 4/2003 | |
| EP | 1 683 406 A1 | 7/2006 | |
| GB | 1403797 A * | 8/1975 | C08L 77/00 |
| WO | WO 95/06402 | 3/1995 | |
| WO | WO 96/30447 | 10/1996 | |

* cited by examiner

CUTTING FILAMENT WITH IMPROVED COMPOSITION FOR EDGE TRIMMERS, SCRUB CUTTERS AND THE LIKE

CROSS-REFERENCE TO RELATED APPLICATION

The present patent application is a Continuation-In-Part of application Ser. No. 12/936,512, filed Oct. 5, 2010 now abandoned, which is a non-provisional application, which claims the benefit of International application number PCT/EP2008/054421, filed Apr. 11, 2008.

The present invention generally relates to devices for cutting vegetation such as scrub cutters, edge trimmers and the like, and is more particularly directed to new cutting filaments for such devices Such cutting filaments are generally fitted with a combustion engine or electric motor which rotates at a high speed which may be between about 3000 and 12000 rpm, a rotary cutting head which carries one or more cutting lines.

Such cutting filament is generally made by extruding/drawing polyamide, and significant developments of these filaments have been known for a few years. For example, suitable shapes for reducing noise, improving cutting efficiency, etc . . . and the provision of strands in different materials in order to improve cutting efficiency, improve biodegrability to reduce manufacturing costs, etc . . . had been already disclosed.

The raw materials most often used to make cutting lines are synthetic substances, and more particularly polyamide 6, polyamide 6-6, copolyamide 6/6-6 and copolyamide 6/9 or 6/12 notably. These substances can be very slightly modified or filled to improve their basic properties. These substances are most often extruded in a form of monofilaments that can have varying diameters and cross-sections, in particular a round cross-section, but also polygonal or star-shaped profiles or cross-sections.

Cutting filaments made from two or more components are also known. They are conventionally manufactured by a co-extrusion method from two sources of different materials.

More specifically, filaments including a main body or core from polyamide and a secondary portion such as a skin totally or partially surrounding the core, from a material different from that of the core, are known. A "different material" means here a material with at least one physical or chemical property which is different from that of the material of the core.

The cutting lines currently manufactured are satisfactory, but their properties, performance or other qualities are still limited by the properties of the raw materials used to make them. In particular, raw materials are more and more expensive due to the increase of crude oil among others.

Moreover, traditional cutting lines made of polyamide are virtually non-degradable by oxo-degradation, photo-degradation, thermo-degradation or in the environment after use. Indeed, even if ultra-violet radiation manages to damage the exterior surface at these lines, as do moisture and oxygen contained in the air, their breakdown process is extremely slow, propagated layer by layer from the exterior of the line toward its inside.

Moreover, the ends or end portions of such cutting lines made of polyamide tend to fibrillate, i.e. to break up into a number of small fibers having a much smaller cross-section and effective mass than the initial strand.

Since the energy available for cutting is greater at the tip of the filament, any reduction in the cross-sectional area, and effective mass of the filament correspondingly reduces the ability of the filament to cut the vegetation that it strikes.

There is currently no known substance that would by itself be suitable for use in a cutting line that would not fibrillate and retaining its basic qualities.

There is thus a need for cutting line that would degrade more quickly in the environment than known filaments and that could be manufactured at a reasonable cost, but of course still having a satisfactory cutting efficiency.

Accordingly, the present invention provides according to a first aspect a cutting member for a plant-cutting device such as a scrub cutter or edge trimmer wherein at least one portion of the cutting member is a mixture of at least a polyamide, at least one thermoplastic polyolefin, and at least one prodegradant agent.

Said thermoplastic polyolefin preferably is chosen from the group consisting of Polypropylene (PP) and Polyethylene (PE).

According to a preferred embodiment, said thermoplastic polyolefin is a low-density polyethylene (LDPE).

The prodegradant agent advantageously comprises an agent promoting photo-degradation and/or an agent promoting thermo-degradation of the thermoplastic polyolefin.

For example, the prodegradant agent comprises manganese stearate, iron stearate or cobalt stearate, or a mixture thereof.

Said at least one portion of the cutting filament typically contains from 5 to 50% by weight of said thermoplastic polyolefin.

In addition, it contains preferably from 0.2 to 20%, preferably from 2 to 10%, and most preferably from 4 to 8% by weight of said prodegradant agent.

Said at least one portion may also advantageously comprise an antioxidant agent, in a proportion preferably comprised between 1 and 2% by weight.

Besides, at least one compatibilization agent, e.g. Ethylene Vinyl Acetate (EVA) or a polyolefin grafted with maleic anhydride, may be added to said mixture.

According to a particular embodiment of the invention, the cutting filament comprises a first core-forming portion and a second portion at least partially surrounding the core portion and defining at least one area for attacking plants.

In particular, the second portion may entirely surround the core of the cutting member.

Both cutting member portions may be made from mixtures of at least a polyamide, at least one thermoplastic polyolefin and at least one prodegradant agent, said second portion being made from a mixture containing a larger proportion of said thermoplastic polyolefin than the first portion.

Said thermoplastic polyolefin may be a recycled material.

The present invention further provides a composition for use in the manufacture of a cutting member such as a cutting filament by extrusion/drawing or injection, made from a mixture of at least a polyamide and at least one another thermoplastic material.

Said thermoplastic polyolefin preferably is chosen from the group consisting of Polypropylene (PP) and Polyethylene (PE).

According to a preferred embodiment, said thermoplastic polyolefin is a low-density polyethylene (LDPE).

The prodegradant agent advantageously comprises an agent promoting photo-degradation and/or an agent promoting thermo-degradation of the thermoplastic polyolefin.

For example, the prodegradant agent comprises manganese stearate, iron stearate or cobalt stearate, or a mixture thereof.

Said composition typically contains from 5 to 50% by weight of said thermoplastic polyolefin.

In addition, it contains preferably from 0.2 to 20%, preferably from 2 to 10%, and most preferably from 4 to 8% by weight of said prodegradant agent.

The composition may also advantageously comprise an antioxidant agent, in a proportion preferably comprised between 1 and 2% by weight.

Besides, at least one compatibilization agent, e.g. Ethylene Vinyl Acetate (EVA) or a polyolefin grafted with maleic anhydride, may be added to said mixture.

Said thermoplastic polyolefin may be a recycled material.

Embodiments of varying scope are described herein.

In addition to the aspects described in this summary, further aspects will become apparent by reference to the drawings and with reference to the detailed description that follows.

FIG. 1 is a schematic sectional perspective view of a cutting filament with a first construction according to the invention, FIG. 2 is a schematic sectional perspective view of a cutting filament with a second construction according to the invention, FIG. 3 is a schematic sectional perspective view of a cutting filament with a third construction according to the invention, FIGS. 4 and 5 are perspective views of a used cutting filament having the construction shown in FIG. 1, made from polyamide and from a mixture according to the invention, respectively.

With reference to FIG. 1, a cutting filament has been illustrated for a motorized plant-cutting device such as an edge cutter, scrub cutter, etc., which has a symmetrical rhombus cross-section 1.

The cutting filament is made with a mixture comprising at least a polyamide, at least one thermoplastic polyolefin, and at least one prodegradant agent.

"Polyamide" means in the present text either homopolymers (such as PA6 or PA6-6) or copolymers (e.g. PA 6/6-6).

The cutting filament is a monofilament, i.e. it is made by extruding at the same time said mixture of materials, as opposed to a filament that would be made by interlacing several strands of identical or different materials.

As a consequence, the structure of the filament is an entanglement of chains of polyamide and chains of thermoplastic polyolefin.

The prodegradant agent is an agent that promotes degradation of the thermoplastic polyolefin under certain conditions.

"Degradation" is an oxidation process that comprises photo-degradation, i.e. degradation of the thermoplastic polyolefin provided by photons, and/or thermo-degradation, i.e. degradation of the thermoplastic polyolefin under the influence of heat.

The prodegradant agent is chosen among agents that promote photo-degradation, agents that promote thermo-degradation and agents that promote both thermo- and photo-degradation.

Depending on the composition of the prodegradant agent, the degradation of the thermoplastic polyolefin may occur mainly by a photo-degradation process, mainly by a thermo-degradation process, or by both processes, simultaneously or in sequence.

The skilled person is able to choose the appropriate prodegradant agent among the products that are available on the market.

For example, photo-degradation is mainly promoted by iron stearate, whereas thermo-degradation is mainly promoted by manganese stearate.

If the prodegradant agent comprises both products, photo- and thermo-degradation of the thermoplastic polyolefin will occur.

Cobalt stearate can also be used to promote both photo- and thermo-degradation.

In such case, the thermoplastic polyolefin of the filament typically begins being degraded under the influence of ultra-violet light (photo-degradation step) then, when small parts of the filament are buried into the ground, thermo-degradation occurs preferentially.

The preferred proportion of the thermoplastic polyolefin is between 5 and 50% by weight.

The presence of the thermoplastic polyolefin in the filament composition allows obtaining a cutting filament with appropriate flexibility and hardness, and furthering with the property of limited or no fibrillation even after extensive use.

Besides, since thermoplastic polyolefins have a lower density than polyamide, the addition of a thermoplastic polyolefin has an effect of lowering the density of the filament.

Therefore, when degradation of the thermoplastic polyolefin chains occurs, the filament tends to disintegrate since the cohesion of the polyamide chains gradually decreases.

After sufficient degradation of the thermoplastic polyolefin, there thus remain only polyamide particles that are much smaller than a filament fully made of polyamide.

The polyamide particles can thus be degraded more easily by the environment, and especially be decomposed more quickly by micro-organisms in particular because the ratio between their mass and exposed surface area is substantially decreased.

In other words, the thermoplastic polyolefin and the prodegradant agent act in synergy to provide an accelerated decomposition of the cutting filament.

The proportion of the prodegradant agent results from a trade-off between, on the one hand, the mechanical properties of the filament and, on the other hand, its ability to degrade within a given time.

The optimal proportion of prodegradant agent also depends on the proportion of thermoplastic polyolefin in the filament and on the expected storage conditions (of course, the filament must not degrade during several months of storage but only after use).

To avoid that the cutting filament begins to decompose during storage, the composition can comprise an antioxidant agent.

The antioxidant agent is preferably a phenolic antioxidant (e.g. sold under the name Irganox®) and its proportion is typically between 1 and 2% by weight, but may vary depending of the expected storage conditions.

For example, a proportion of photo- and thermo-prodegradant agent comprised between 2 and 10% by weight, preferably between 4 and 8%, added to a mixture comprising about 50% of polyamide and 50% of LDPE, provides a filament that presents satisfactory mechanical properties.

A 20 μm-thick film of said composition was tested in real climatic conditions and proved that it was able to degrade significantly in about six months, and its biodegradability in the ground was estimated to about three years.

The cutting filament composition can further contain at least one of compatibilization agent consisting preferably in Ethylene Vinyl Acetate (EVA) or in any polyolefin grafted with maleic anhydride or similar.

For instance, the compatibilizer is a material known per se for compatibilizing polyamides and polyethylenes. Examples which may be mentioned are:

- polyethylene, ethylene-propylene copolymers and ethylene-butene copolymers, where all of these materials are grafted with maleic anhydride or with glycidyl methacrylate,
- ethylene/alkyl (meth)acrylate/maleic anhydride copolymers, where the maleic anhydride is grafted or copolymerized,
- ethylene/vinyl acetate/maleic anhydride copolymers, where the maleic anhydride is grafted or copolymerized,
- the two abovementioned copolymers condensed with polyamides or oligomers of polyamides having only one amine end group,
- the two abovementioned copolymers (ethylene/alkyl (meth)acrylate or ethylene/vinyl acetate) in which the maleic anhydride is replaced by glycidyl methacrylate,
- ethylene/(meth)acrylic acid copolymers and optionally salts of these,
- polyethylene, polypropylene or ethylene-propylene copolymers, where these polymers are grafted with a material containing a site reactive to amines; where these graft copolymers are then condensed with polyamides or polyamide oligomers having only one amine end group.

All these materials are described in the European patent application EP 0342066 and in the U.S. Pat. No. 5,342,886, the contents of which is incorporated by reference in the present application.

Other compatibilization agents such as those described in the U.S. Pat. No. 3,963,799, the international patent application WO96/30447 or in the European patent application EP 1 057 870 can be used without departing of the scope of the invention.

The proportion of the compatibilizer is preferably comprised between 0.1 and 5%, preferably between 0.5 and 2% by weight.

In a particular preferred embodiment of the present invention, the cutting filament is made from a mixture of a polyamide, low-density polyethylene (LDPE) and a prodegradant agent.

The preferred proportion of LDPE is between 5 and 50% by weight.

In another form of the invention, the thermoplastic polyolefin is a highly branched polymer material, so-called "hyper-branched thermoplastic". "Hyper branched" in the context of the present invention means that the degree of branching (DB) is from 10 to 99.9%, and preferably from 20 to 99%, particularly preferably from 20 to 95%. See also P. J. FLORY, J. AM. CHEM. SOC., 1952, 74, 2718, and H. FREY et al., CHEM. EUR. J., 2000, 6, no. 14, 2499 for the definition of hyper branched polymers.

According to another embodiment, the composition of the cutting filament is a mixture of polyamide, a linear Polyethylene, i.e. a high-density polyethylene (HDPE) or a linear low density polyethylene (LLDPE) and a prodegradant agent.

This allows obtaining a cutting filament with appropriate flexibility and hardness, and further with the property of limited or no fibrillation even after extensive use.

The preferred proportion of HDPE is between 5 and 50% by weight.

It should be noted that the cutting filament can have any cross-sectional shape without departing from the scope of the invention.

FIG. 4 illustrates a used cutting filament made of polyamide that has begun to fibrillate, whereas

In the present example, the skin 2 totally surrounds the core 1, although it could only partly surround the core.

The core has a cross-section with a simple or complex shape. In the case in point, the core 1 has a general circular section.

The skin 2 may have any desired cross-section. In the present example, the skin 2 has a circular section 2 coaxial with the core.

Figure 1:
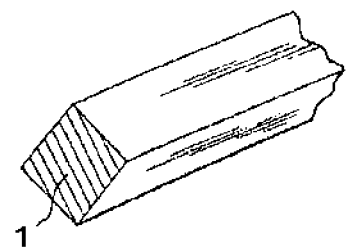
Figure 2:
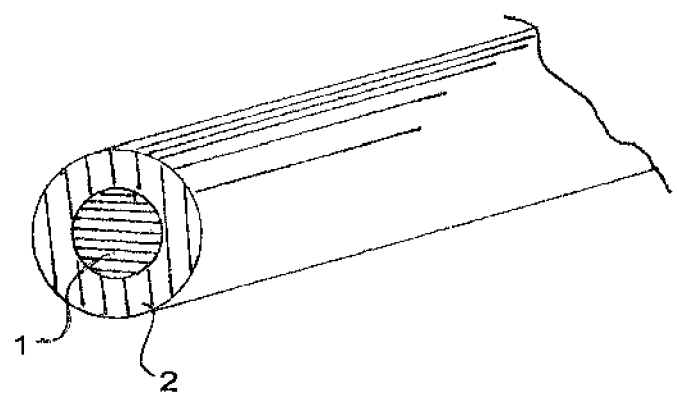
FIG. 2 illustrates a filament construction of the invention with a central core 1 and a skin 2.

In this example, the core 1 is made from the same material as the whole filament disclosed in FIG. 1, i.e. with a mixture of polyamide, at least one thermoplastic polyolefin (preferably at least one of LDPE, LLDPE, HDPE and PP as mentioned above) and a prodegradant agent.

The skin 2 is made on from a similar mixture containing a larger or a lower proportion of said thermoplastic polyolefin than the mixture used for the core 1, depending on a trade-off between the hardness of the skin with respect to that of the core and its ability to degrade within a given time.

Figure 3:
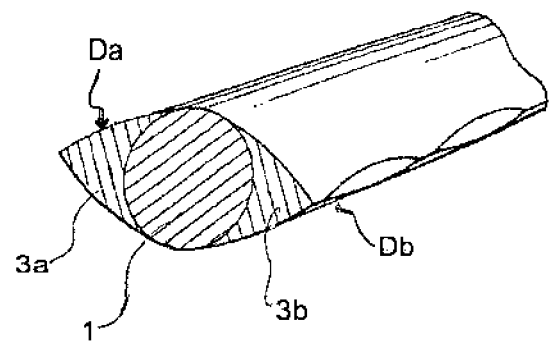
Figure 4:
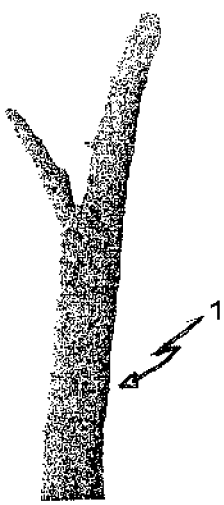
Figure 5:
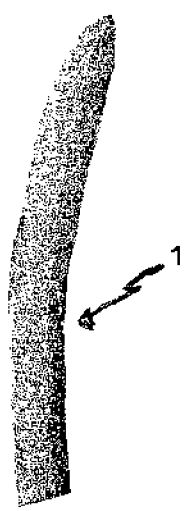
FIG. 5 shows a used cutting filament made of a mixture of polyamide and a thermoplastic polyolefin, which does not exhibit any fibrillation.

Finally, FIG. 3 illustrates another construction of a cutting filament according to the invention, with a central core 1 and two wings 3a, 3b separate from each other and further forming serrated or toothed cutting zones Da and Db.

Advantageously, the filaments according to the invention are made by a conventional extrusion/drawing process (with a co-extrusion in the case of filaments comprising two or more materials) or by injection with a composition as described above. The present further concerns the composition itself.

Moreover, the thermoplastic polyolefin is advantageously a material obtained through recycling, e.g. from the recycling of packaging materials.

This further allows decreasing the manufacturing cost of the filament.

It should be noted here that the present invention may be combined by the skilled person with many other enhancements generally known in the field of cutting filaments (filaments with a particular shape and/or coatings or material combinations from improving the cutting efficiency, reducing the operating noise, enhancing biodegradability, preventing sticking phenomena, etc . . . ).

This written description uses examples to disclose the invention, including the best mode, and also to enable any person skilled in the art to make and use the invention. The scope of the subject matter described herein is defined by the claims and may include other examples that occur to those skilled in the art. For instance, the thermoplastic polyolefin can be a metallocene polyethylene, LDPE from free-radical polymerization, high-density polyethylene (HDPE), or medium-density polyethylene (MDPE), linear low-density polyethylene (LLDPE), or very-low-density polyethylene (VLDPE) which is a copolymer of ethylene and an alpha-olefin selected from among 1-butene, methylpentene, 1-hexene and 1-octene.

Moreover, the invention is intended to any cutting member for a plant-cutting device such as blades as disclosed in the U.S. Pat. No. 4,406,065 for example without departing of the scope of the invention.

Such other examples are intended to be within the scope of the claims if they have structural elements that do not differ from the literal language of the claims, or if they include equivalent structural elements with insubstantial differences from the literal language of the claims.

The invention claimed is:

1. A cutting filament for a plant-cutting device,
    wherein the whole cutting filament is made of a mixture of at least a polyamide, at least one thermoplastic polyolefin, at least one prodegradant agent for promoting degradation of the thermoplastic olefin in the mixture, at least one antioxidant agent, and at least one compatibilization agent,
    wherein said cutting filament contains from 5 to 50% by weight of said polyolefin with respect to the weight of the mixture, 0.2 to 20% by weight of said prodegradant agent with respect to the weight of the mixture, from 1 to 2% by weight of said antioxidant agent with respect to the weight of the mixture, and 0.1 to 5% by weight of said compatibilization agent with respect to the weight of the mixture,
    wherein said thermoplastic polyolefin is a low-density polyethylene (LDPE),
    wherein said prodegradant agent comprises at least one of: manganese stearate, iron stearate, and cobalt stearate,
    wherein said antioxidant agent is a phenolic antioxidant,
    wherein said compatibilization agent is Ethylene Vinyl Acetate (EVA) and the rest of the mixture being the polyamide.

2. The cutting filament of claim 1, wherein said thermoplastic polyolefin further comprises Polypropylene (PP).

3. The cutting filament of claim 1, wherein said compatibilization agent further comprises a polyolefin grafted with maleic anhydride.

4. The cutting filament of claim 1, wherein said thermoplastic polyolefin is a recycled material.

5. A cutting filament for a plant-cutting device, comprising a first core-forming portion and a second portion at least partially surrounding the core portion and defining at least one area for attacking plants,
    wherein both cutting filament portions are made from mixtures of at least a polyamide, at least one thermoplastic polyolefin, at least one prodegradant agent for promoting degradation of the thermoplastic olefin in the mixtures, at least one antioxidant agent, and at least one compatibilization agent,
    wherein said cutting filament contains from 5 to 50% by weight of said polyolefin with respect to the weight of the mixtures, 0.2 to 20% by weight of said prodegradant agent with respect to the weight of the mixtures, from 1 to 2% by weight of said antioxidant agent with respect to the weight of the mixtures, and 0.1 to 5% by weight of said compatibilization agent with respect to the weight of the mixtures,
    wherein said thermoplastic polyolefin is a low-density polyethylene (LDPE),
    wherein said prodegradant agent comprises at least one of: manganese stearate, iron stearate, and cobalt stearate,
    wherein said antioxidant agent is a phenolic antioxidant,
    wherein said compatibilization agent is Ethylene Vinyl Acetate (EVA),
    the rest of the mixtures being the polyamide, and
    said second portion containing a different proportion, within the range of 5 to 50% by weight with respect to the weight of the mixtures, of said thermoplastic polyolefin than the first portion.

6. The cutting filament of claim 5, wherein the second portion entirely surrounds the core of the cutting filament.

* * * * *